United States Patent [19] [11] Patent Number: 4,611,848
Romano [45] Date of Patent: Sep. 16, 1986

[54] SLIDING COVER ASSEMBLY FOR OPEN BODY TRUCKS

[76] Inventor: Frank S. Romano, 7926 Shasta Court, S.E., Lacey, Wash. 98503

[21] Appl. No.: 723,447

[22] Filed: Apr. 15, 1985

[51] Int. Cl.$^4$ ............................................... B60J 7/10
[52] U.S. Cl. ..................... 296/98; 296/100; 49/425; 160/23 R; 160/133; 160/202
[58] Field of Search ................. 296/98, 100, 101, 219; 49/420-421, 425-426; 160/32, 35, 84 R, 133, 201-202, 23 R, 229 R, 235; 198/838, 845; 238/382

[56] References Cited

U.S. PATENT DOCUMENTS

| 206,738 | 7/1882 | Leypoldt | 238/382 X |
| 1,117,960 | 11/1914 | McIntyre | 160/23 R |
| 1,878,710 | 9/1932 | Watson | 160/23 R |
| 2,898,988 | 8/1959 | Zoll | 160/229 R |
| 3,056,451 | 10/1962 | Federline et al. | 160/235 X |
| 3,146,824 | 9/1964 | Veilleux | 296/98 X |
| 3,649,072 | 3/1972 | Cross | 296/100 X |
| 4,210,361 | 7/1980 | Marvin et al. | 296/100 X |
| 4,252,362 | 2/1981 | Campbell | 296/100 X |
| 4,518,194 | 5/1985 | Kirkham et al. | 296/100 X |

Primary Examiner—Robert B. Reeves
Assistant Examiner—Russell D. Stomer
Attorney, Agent, or Firm—Brian J. Coyne

[57] ABSTRACT

An improved sliding cover assembly for converting the open body of a truck, or the like, to a closed body. The assembly comprises an articulated-type cover slidably mounted in a pair of parallel tracks of C-shaped cross-section, each of the said tracks having a lengthwise coextensive channel communicating with the interior space of the open body. The cover includes a plurality of rectangular panels successively disposed adjacent to one another and extending across said open body. Each panel includes a first semi-cylindrical edge portion and a second, semi-cylindrical edge portion having a radius larger than the radius of the first edge portion, said first edge portion being concentric with, and rotatably received by, said second edge portion of the adjacent panel, the successive panels preferably being alternately wide and narrow, whereby the cover may be wound into a space-saving rolled configuration for storage when the cover is slid to its open position. a rewind tube is mounted on two pinch blocks fixed to the forward end of the open body and on opposite sides thereof. A spring cover tube with a guide wheel at each end is rotatably circumposed about the rewind tube. The forwardmost panel of the cover is attached to the guide wheels such that translational motion of the cover corresponds to rotation of the guide wheels and the spring cover tube. A coil spring having one end attached to the rewind tube and its other end attached to one guide wheel urges the cover to its open position.

5 Claims, 12 Drawing Figures

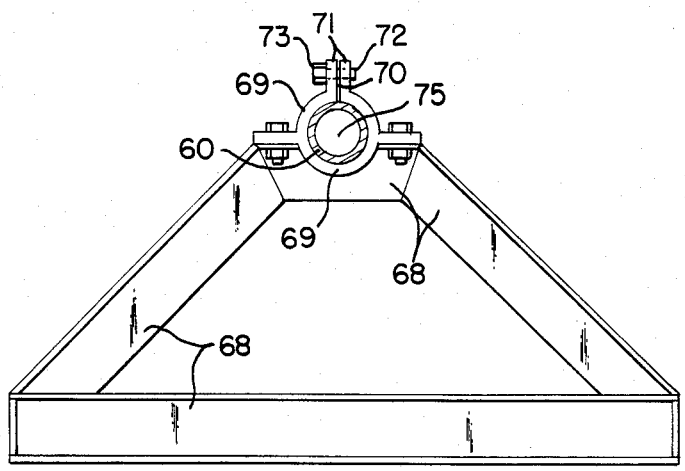
FIG. 9
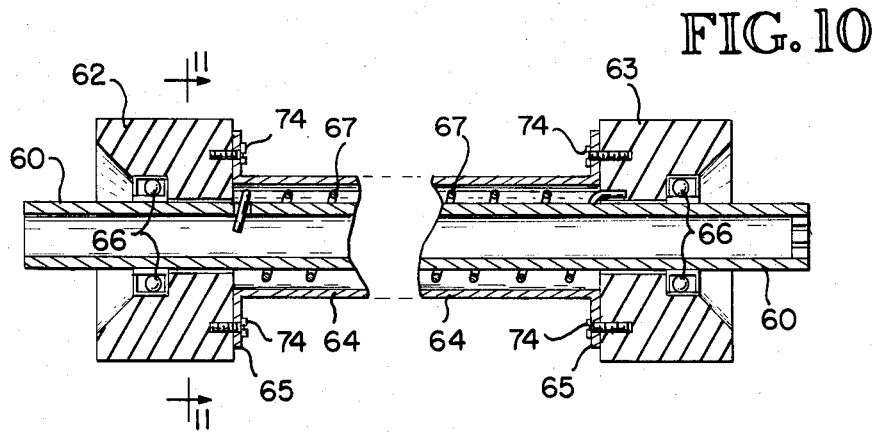
FIG. 10
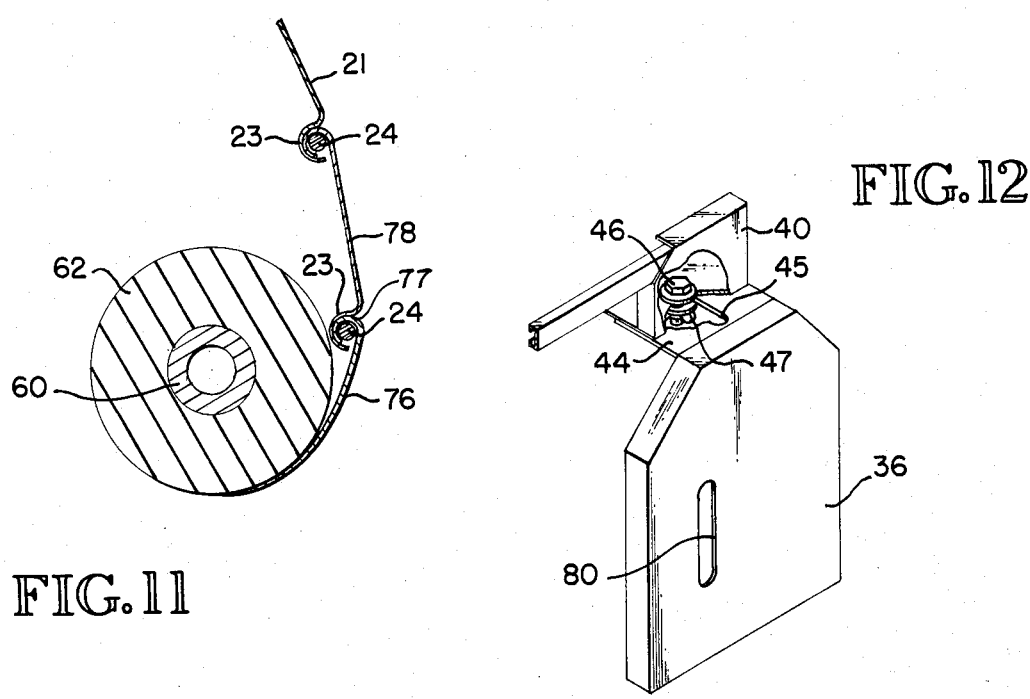
FIG. 11
FIG. 12

SLIDING COVER ASSEMBLY FOR OPEN BODY TRUCKS

BACKGROUND OF THE INVENTION

1. Field of the Invention

This invention is for an improved sliding cover assembly for attachment to an open body truck for conversion to a closed body truck.

2. Description of the Prior Art

The advantages in having a sliding cover assembly capable of converting the open body of a truck to a closed body have long been recognized: on the one hand, the closed-body configuration can provide protection of cargo from adverse weather and from thieves, reduced wind resistance with improved fuel efficiency, and reduced risk of cargo being lost from the truck as by wind gusts; the open-body configuration, on the other hand, enables the truck to receive and transport large, bulky cargo that can not be loaded into the closed body of the truck.

In the prior art, such assemblies have generally included a pair of tracks mounted on the upper portions of the side walls of the open body of a truck, the tracks having lengthwise coextensive channels communicating with the interior space of the open body. Slidably mounted on the tracks was a cover means that could be slid forward to uncover the body and that could be slid rearward to completely cover the body. The assembly may also have included locking means for locking the cover means in the closed position, and possibly means for storing the cover means in the forward portion of the body, as by winding the cover means upon a drum.

Such an assembly was described by O. I. Groth, U.S. Pat. No. 2,992,040 (July 11, 1961; Class 296/100), who described an articulated-type cover means comprising a flexible covering sheet, rubberized fabric for example, and a plurality of transversely elongate, rigid members connected in parallel array to the undersurface of the covering sheet and extending across the body of the truck. Each member included a terminal head at each end in sliding engagement in a track. Although this could provide a watertight covering, the flexible covering sheet was easily susceptible to penetration as by a knife, and was, therefore, not theft-proof.

F. R. Cross described a slidable telescopic cover for the bed of pickup trucks and the like. U.S. Pat. No. 3,649,072 (Mar. 14, 1972; Class 296/137B). Cross's cover means comprised a plurality of transversely elongate, rectangular slat-forming panels wherein the trailing edge of each panel had a downturned flange and the leading edge of each panel included a downwardly and forwardly inclined cam surface terminating in an upturned flange thereby defining an unpwardly opening transverse trough. The downturned flange of each lead panel hooked behind the upturned flange of the adjacent following panel to define an interlocking chain thereof. In its fully-closed configuration, the panels lay in a substantially planar, close parallel array. The body of the truck could be uncovered by pushing forward on the trailing edge of the rearmost panel thereby causing the downturned flange on the panel second from the rear to begin to ride up on the inclined cam surface until it became tightly wedged between the latter surface and the upper rail of the track, whereupon, both the rear panel and the one second from the rear would start to move forward together. In this manner, one by one, the panels would be forced into stacked relation at the forward portion of the body of the truck. There were several problems with Cross's assembly, however: rainwater tended to leak through the cover means where adjacent panels interlock; there was excessive friction associated with the sliding of the ends of the panels in the tracks; if a track became deformed even slightly, forward sliding of the panels to uncover the body would tend to cause the panels rearward of the deformity to telescope into stacked relation instead of first sliding together to the front portion of the body; and the assembly in its closed configuration was not theft-proof as interlocked adjacent panels could be easily disengaged by pressing downward on the panels to create a gap between the leading edge of one panel and the interlocked trailing edge of an adjacent panel.

J. J. McKeon has described an assembly wherein the cover means was likewise comprised of a plurality of panels. U.S. Pat. No. 4,138,361 (Classes 296/98, 296/137D; Feb. 6, 1979). Each of the panels had a longitudinally-extending, generally hook-shaped flange depending from each of the longitudinal edges thereof, one of which was dimensionally smaller than the other, and wherein the smaller, hook-shaped flange of each panel was pivotably received within the larger hook-shaped flange of the adjacent panel. This permitted coiling and uncoiling of the cover means upon a drum in the forward portion of the body of the truck. McKeon's cover means suffered from some of the same disadvantages as Cross's: it tended to leak, the panels were easily disengaged one from another, and it lacked strength.

H. Z. Marvin described an assembly in which the cover means comprised a sheet of corrugated material extending between the tracks and across the open body, which cover means further comprised a plurality of wheels rotatably mounted along the left and right outer margins of the corrugated sheet and within the channels of the left and right tracks in order to reduce the friction of sliding movement of the cover means. U.S. Pat. No. 4,210,361 (Classes 296/210, 296/100, 296/219; July 1, 1980). The assembly included spring actuated return means mounted at a forward end of the open body and conected to the forward edge portion of the cover means. As an alternative embodiment for his invention, Marvin also described an articulated-type cover consisting of a parallel array of successively disposed panels, each panel having an arcuate edge portion somewhat cylindrical in shape with an opening along its full length for receiving a cylindrical member such as a shaft mounted at the other and adjacent edge portion of the panels. Each panel was bent at an obtuse angle near its shaft-shaped edge to permit the folding together of the panels one against the other as the cover is slid into the open body position. Strips of waterproof sheet material such as plastic were positioned over the junctures of the panels with their edges secured by clips on the panels in order to prevent leakage of rain, etc., between the panels. Marvin's corrugated sheet lacked strength and was not theft-proof. Likewise, his articulated-type cover had low strength and was vulnerable to thieves because the shaft portions of the panels could be popped out of the arcuate edge portions of the panels. Moreover, the method of waterproofing the panels was unsatisfactory because the waterproof sheet material could deteriorate and become dislodged.

J. T. Campbell described a sliding cover assembly for the bed of a pickup truck or the like characterized by a multichanneled track that permitted the user to close off all or a just a portion of the open body. U.S. Pat. No. 4,252,362 (Classes 296/98, 296/100; Feb. 24, 1981). Campbell described cover means including a double-layered fabric sheet and a plurality of transversely-extending rigid rods hemmed or otherwise secured in fixed spaced parallel relation between the double-layered fabric. Recognizing that this arrangement would not provide much security, Campbell suggested that the fabric part of the cover means should include some flexible wire mesh that both resists being cut and also inhibits its being pushed back along the rod. The ends of the rods inserted into the channels of the left and right tracks that were mounted on the side walls of the truck, each of the said ends having a nylon roller rotatably mounted thereon for rolling within the channels. Campbell's assembly, even if the cover means were reinforced with flexible wire mesh, was still vulnerable to a determined thief.

W. McMillan described a flexible cover assembly for vehicles including, in one embodiment, an articulated-type sliding cover. U.S. Pat. No. 1,950,927 (Class 296/1; Mar. 13, 1934). The cover comprised a parallel array of successively disposed panels formed from sheet metal, each panel having one end turned downwardly and rolled over upon itself to provide a hinge knuckle while the other end was left straight and was also turned over upon itself so as to form a hinge knuckle. The hinge knuckles of apposing edges of adjacent panels cooperated with each other to form hinged connections at the junctures of the panels, and a hinge pin was inserted through the knuckles at each juncture. The articulated cover was mounted for sliding movement in tracks. McMillan's assembly lacked the strength, compactness and low friction of my improved assembly.

SUMMARY OF THE INVENTION

It is an object of my invention to provide an improved sliding cover assembly for open body trucks that can be readily slid to cover or uncover the open body.

Another object of my invention is to provide an improved sliding cover assembly for open body trucks that renders the body of the truck watertight for protection of the truck's cargo against inclement weather.

A further object of my invention is to provide an improved sliding cover assembly for open body trucks that requires minimal space for storage of the cover on the truck when the cover is slid to its open position.

A still further object of my invention is to provide an improved sliding cover assembly for open body trucks with reduced sliding friction such that the user can, with just one hand grasping the trailing edge of the cover, slide the cover from the fully closed position to the fully open position, and vice-versa.

Other objects of my invention are to provide an improved sliding cover assembly for open body trucks that is light in weight, strong enough to support the weight of a 150 pound man if he should he walk upon it, theft-proof, easily disassembled for maintenance, adaptable to trucks having different body sizes, and inexpensive to manufacture.

BRIEF DESCRIPTION OF THE DRAWINGS

FIG. 9 is an elevational view of a pinch block;

FIG. 10 is a fragmentary longitudinal section taken along the line 10—10 of FIG. 8 showing the left and right guide wheels and the interior of the cover tube;

FIG. 11 is a fragmentary section taken along the line 11—11 of FIG. 10 with the addition of the cover means and showing the manner of attachment of the forward-most panel thereof to the guide wheel;

FIG. 12 is a perspective view of an alternative embodiment of a side panel of the housing, including a cutout view thereof, showing the slidably adjustable attachment of the upper portion of the side panel by bolt and wing nut.

Similar numerals refer to similar parts throughout the several views. The terms "left", "right", "forward" and "rear" shall be understood to refer to the left and right sides, and forward and rear portions, of the truck as shown in FIG. 2.

DESCRIPTION OF THE PREFERRED EMBODIMENT

Figure 1:
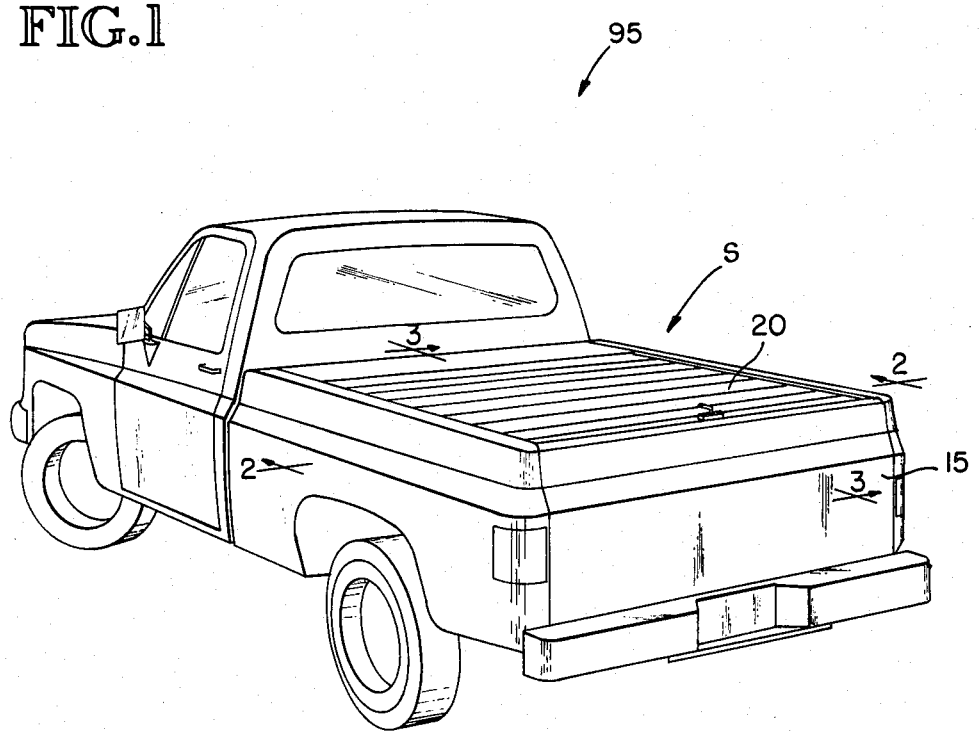
FIG. 1 is a perspective view looking from a position above and to the left rear of a pickup truck, the body of which is equipped with my improved sliding cover assembly.
Figure 2:
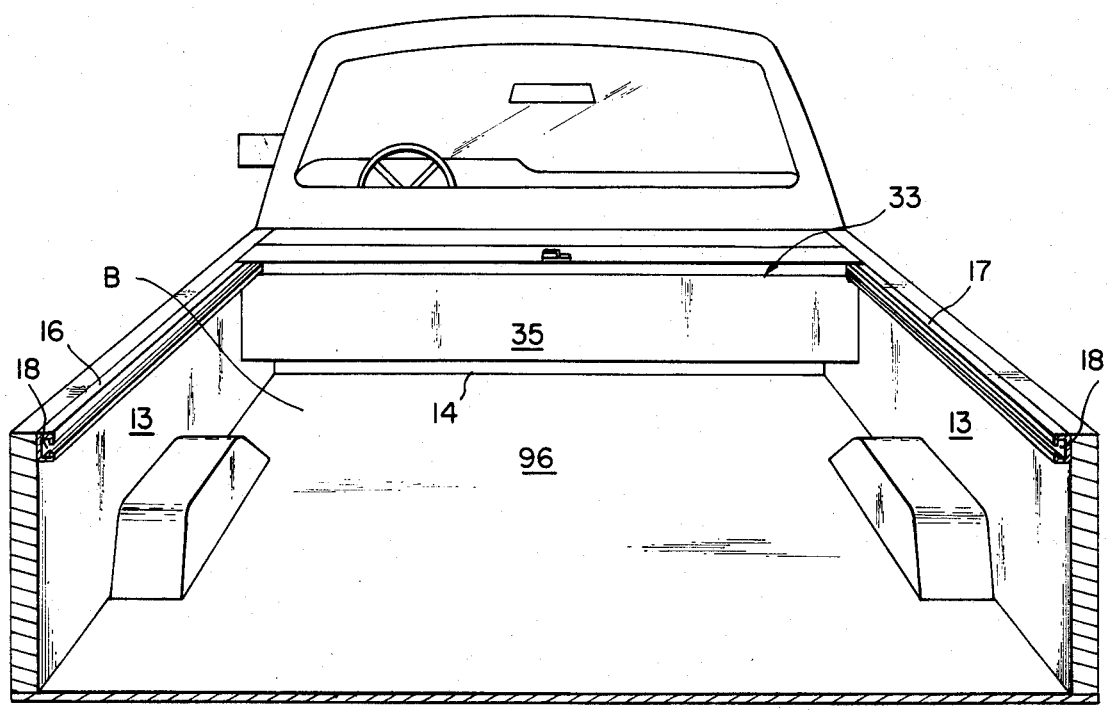
FIG. 2 is a fragmentary section to an enlarged scale taken along line 2—2 of FIG. 1.

Referring now to FIG. 1, an open body truck, specifically a pickup truck, designated generally by the numeral 95, is shown on which my improved sliding cover assembly -S- has been mounted. The assembly -S- is shown in the fully closed position. Referring now to FIGS. 1 and 2, the open body truck has an open body -B- consisting of a flat bottom 96, side walls 13, a front wall 14, and a tail gate 15 pivotally mounted at the rear of the bottom 96. The assembly -S- includes guide means, which, in the preferred embodiment, comprises a left track 16 and a right track 17 horizontally mounted on the upper portions of the sidewalls 13, which tracks extend the full length of the side walls 13 from the tail gate 15 to the front wall 14. The tracks 16, 17, are preferably extruded aluminum, and C-shaped in cross-section, thereby defining channels 18 extending the length of the tracks 16, 17, which channels 18 communicate with the interior space of the open body -B-. To prevent water leakage between the tracks 16, 17, and the side walls 13, a water seal 19 is inserted therebetween, as may be seen in FIG. 4.

Figure 3:
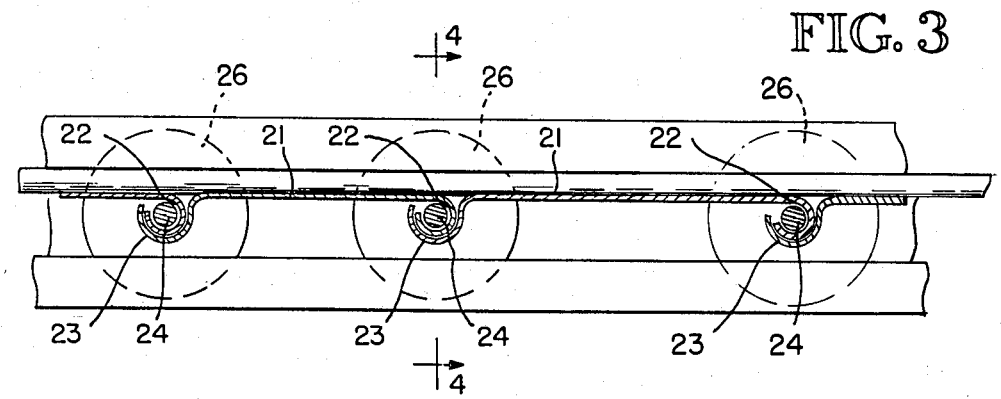
FIG. 3 is a fragmentary longitudinal section taken along line 3—3 of FIG. 1 showing the manner in which the panels of the cover means interlock with one another.

The sliding cover assembly -S- further includes cover means, denoted generally by the numeral 20, slidably mounted in the tracks 16, 17. As shown in FIG. 1, the cover means 20 includes a plurality of essentially planar, transversely elongated, rectangular panels 21 successively disposed adjacent to one another and extending across the open body -B-. Referring now to FIG. 3, each panel 21 includes a first semi-cylindrical edge portion 22 and a second, semi-cylindrical, opposite edge portion 23 having a radius larger than the radius of the first edge portion 22, the said first edge portion 22 being concentric with, and rotatably received by, the said second edge portion 23 of the adjacent panel 21. At each juncture between the panels 21 is a rod 24 inserted through the cylindrical space defined by the concentric edge portions 22, 23, of adjacent panels 21.

Figure 4:
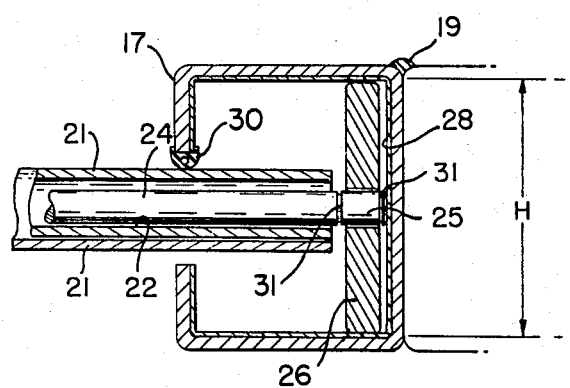
FIG. 4 is a fragmentary section taken along line 4—4 of FIG. 3 showing the right end of one panel mounted inside the right track.
Figure 5:
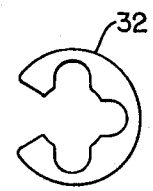
FIG. 5 is an elevational view of a C clip.

Referring now to FIG. 4, the right end portion of the juncture of two panels 21 is shown together with a rod 24 therethrough (the left end portion is the mirror image thereof). It may be seen that the length of the rod 24 is greater than the length of the panels 21 thereby leaving an exposed end portion 25 of the rod 24 at the left and right ends of each panel 21. The exposed end portion 25 of the rod 24 is inserted inside the channel 18 of the track 17. Rotatably mounted on the said exposed end portion 25 is a wheel 26 of diameter slightly less than the height H of the channel for rolling therewithin. The edge of each panel 21 between the rods 24, that is, the flat central portion of each panel 21, is folded downwardly and back upon itself to create a blunt edge (not shown). A latex rubber coating 28 is bonded to the entire inner surface of the tracks 16, 17, in order to reduce noise and vibrations of the wheels 26 while the truck 95 is in motion with the cover means 20 in the closed position. For the same reason, a soft rubber weather seal bead 30 is bonded to the entire length of the open margins of the tracks 16, 17. The preferred method for mounting the wheels 26 on the rods 24 is by inscribing a pair of parallel grooves 31 in each rod transverse to the axis of the rod 24 and on either side of each wheel 26 mounted thereon; a C clip 32 such as shown in FIG. 5 is then inserted in each groove 31 to prevent the wheel 26 from moving transversely across the rod 24. The C clips 32 are easily removed thereby facilitating the disassembly of the cover means 20 for maintenance and repair.

Figure 6:
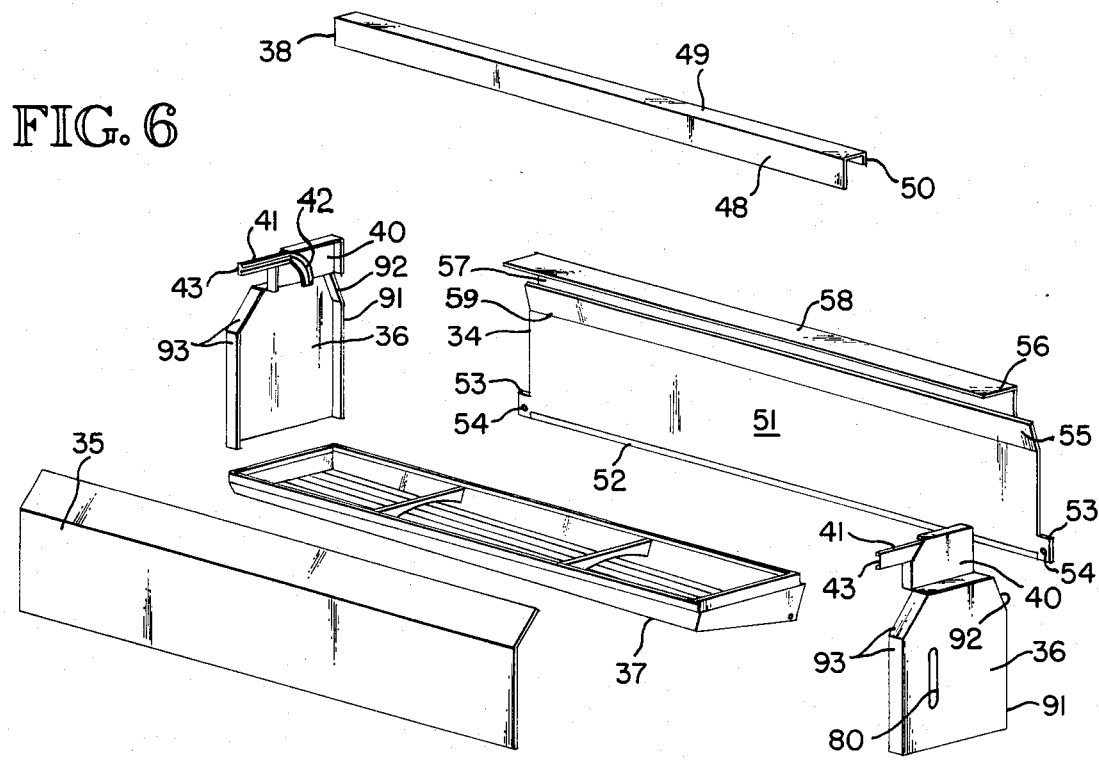
FIG. 6 is an exploded perspective view of the housing of the spring-activated return means looking from a position above and to the right rear of the truck.
Figure 7:
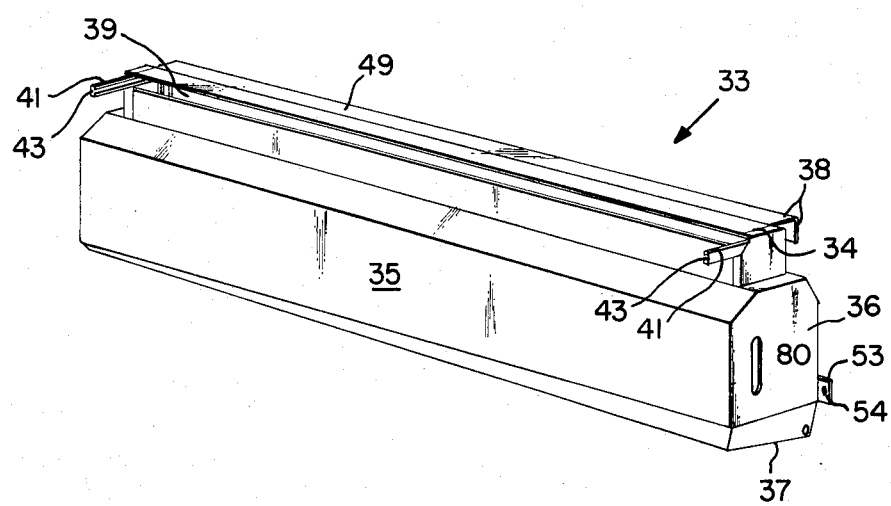
FIG. 7 is a perspective view of the housing of FIG. 6 in assembled form.

My improved sliding cover assembly -S- further includes spring-activated return means for urging the cover means 20 forward toward the front wall 14 in order to facillitate sliding the cover means 20 to the open position; the return means also stores the cover means 20 in a space-saving rolled configuration in the forward portion of the open body -B- when the cover means 20 is in the open position. The return means includes a housing, denoted generally by numeral 33, that is mounted on the front wall 14 of the open body -B- and extends across it. Referring now to FIG. 6, the housing 33 comprises a front panel 34, a rear panel 35, two side panels 36, a drain tray bottom 37 with a weep hole therein (not shown), and a hanging bracket 38. The front panel 34, side panels 36, and rear panel 35 cooperate to define a transverse slot 39 as shown in FIG. 7, through which slot 39 the cover means 20 slides as it is being moved to the opened or closed position. In the preferred embodiment, the upper portion 40 of each side panel 36 is recessed toward the interior of the body -B- and includes a goose-necked-shaped extension 41 including a downwardly curving track 42 that guides the sliding movement of the cover means 20 within the housing 33. The rearmost portions 43 of the extensions 41 abut against the forwardmost portions of the tracks 16, 17 and cooperate therewith to form a continuous guide for the cover means 20. The lower front edge 91 of the side panels 36 is substantially vertical but the upper portion 92 thereof is angled rearwards at about 22 degrees from the vertical. This is to allow the front panel 34 of the housing 33 to lay flush against the front wall 14 and yet allow clearance for the protruding lip that is found on the top rear portion of the front wall of all pickup trucks. The rear panel 35 is bent to conform to the rear edges 93 of the side panels 36.

As shown in FIG. 12, in an alternative embodiment, the upper portion 40 of the side panels 36 is slidably adjustable along a flat horizontal surface 44 of the side panels 36, the said surface 44 having a transverse slot 45, the upper portion 40 being mounted on the horizontal surface 44 by a threaded bolt 46 extending dowwardly from the upper portion 40 through the slot 45 and secured by a wing nut 47 or the equivalent. Thus, this alternative embodiment facillitates adjustment of the distance between the extensions 41 so that the assembly -S- can be mounted on trucks having various body widths.

The hanging bracket 38 is formed from a rectangular strip of sheet metal by two parallel 90 degree bends therein, thereby creating a rear surface 48, a top surface 49 and a lip surface 50, each surface being of an appropriate size so that the hanging bracket 38 will fit securely across the top surface of the front wall 14 of the body -B-. The rear panel 34 comprises a flat, rectangular, vertical, bottom portion 51 having a rolled bottom edge 52 and a pair of ears 53 extending outwardly thereof, said ears 53 each having an aperture 54 for attachment of the housing 33 to the front wall 14 by machine screws; a flat, rectangular, central portion 55 bent slightly rearwards from the upper margin 59 of the bottom portion 51 and towards the interior of the housing 33; and a top portion 56 including a flat, rectangular, vertical face 57 and, extending rearwardly thereof, a flat, rectangular horizontal face 58. The rear surface 48 of the hanging bracket 38 is attached by machine screws to the vertical face 57 of the rear panel 35.

Figure 8:
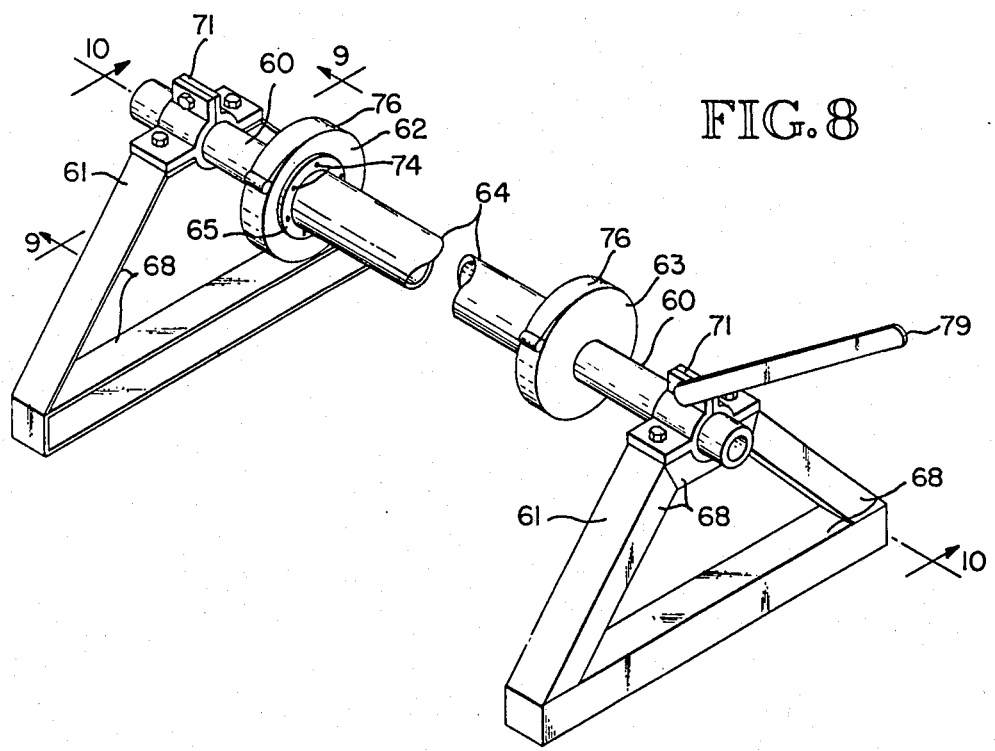
FIG. 8 is a perspective view looking from a position above and to the right rear of the truck showing the spring cover tube, the left and right guide wheels, and the ends of the rewind tube inserted into pinch blocks.

Referring now to FIGS. 8, 9, and 10, the return means further includes a rewind tube 60, of length substantially equal to the distance between the side panels 36 of the housing 33; a pair of pinch blocks 61 mounted on opposite sides of the interior of the housing 33 into which the ends of the rewind tube 60 insert; left and right guide wheels 62, 63, rotatably mounted on the rewind tube 60 near its left and right ends, respectively; and a spring cover tube 64 having a diameter larger than the diameter of the rewind tube 60 and concentric therewith, the said spring cover tube 64 having annular flanges 65 at each of its ends connected by screws 74 or the equivalent to the guide wheels 62, 63. Preferably, the guide wheels 62, 63, include ball bearings 66 to minimize the friction of their rotation. A coil spring 67 is coiled about the rewind tube 60, and inside the spring cover tube 64. One end of the coil spring 67 is attached to the rewind tube 60 near one guide wheel 62; the opposite end of the coil spring 67 is attached to the other guide wheel 63. The pinch blocks 61 have a trapezoidal-shaped base 68, which may be formed from one inch angle iron, and atop thereof, and embedded within the shorter of the two parallel sides of the trapezoidal base 68, is a cylindrical portion 69 having a bore 75 therethrough perpendicular to the plane of the base 68. The cylindrical portion 69 has a slot 70 at its top; extending upwardly from the slot 70, and on either side thereof, is a parallel pair of jaws 71 oriented perpendicular to the plane of the base 68. In at least one of the pinch blocks 61, a threaded bore 72 extends through the jaws 71 and an ajustment screw 73 is threaded therethrough such that by rotation of the screw 73 the jaws 71 can be moved closer or farther apart with corresponding pinching or releasing of the rewind tube 60 by the pinch block 61.

Referring now to FIG. 11, each of the guide wheels 62, 63 has a curved bracket 76 of size and shape to cover about one fourth of the curved surface of the guide wheel 62, 63 and to which surface the bracket 76 is attached. One end of each bracket 76 includes a semi-cylindrical edge portion 77 of size and shape corresponding to the first semi-cylindrical edge portion 22 of each of the panels 21 of the cover means 20. The edge portions 77 of each of the brackets 76 is concentric with, and rotatably received by, the second edge portion 23 of the forwardmost panel 78 of the cover means 20, and a rod 24 is inserted through the cylindrical space defined by the concentric edge portions 77 and 23. Thus, rotary motion of the guide wheels 62, 63 produces a corresponding translational motion of the cover means 20, and vice-versa. With the cover means 20 in the fully open position, the coil spring 67 is in a relatively relaxed state; but as the cover means 20 is slid rearward, the spring cover tube 64 and guide wheels 62, 63 rotate around the rewind tube 60 and, provided the pinch blocks 61 prevent rotation of the rewind tube 60, tension builds in the coil spring 67.

Referring now to FIG. 8, the rewind means further includes a tension adjustment lever 79 having one end attached to the free end of the adjustment screw 73 such that movement of the lever 79 upwards frees the rewind tube 60 for roatation, and movement of the lever 79 downwards locks the rewind tube in the pinch block 61. As shown in FIG. 6, at least one of the side panels 36 has a vertical slot 80 through which the lever 79 projects to accomodate the movement of the lever 79. Thus, with the cover means 20 in some intermediate position, by moving the lever 79 upwards to release the rewind tube 60, the tension in the coil spring 67 can be relaxed, thereby allowing an adjustment of the maximum tension achieved when the cover means 20 is in the fully closed position.

As the cover means 20 is slid to the fully open position, it is wound around the guide wheels 62, 63. It is desirable to minimize the size of the cover means in the resulting rolled-configuration so that camper tops and other accessories can be mounted on the open body -B- without the having to first remove the assembly -S-. To achieve the absolute minimally-sized rolled configuration would require that the width and thickness of the panels 21 be vanishingly small and that the number of panels 21 and rods 24 be infinitely large. An excellent compromise, however, can be achieved by making the panels 21 alternately wide and narrow, as shown in FIG. 3. Alternating widths of two inches and two and one-half inches is preferred in order to achieve the simultaneous goals of minimal size and manufacturing cost but with adequate strength.

In order to achieve the desired light weight, low cost, low friction, and high strength, the preferred material for fabricating the assembly -S- is mainly aluminum, except that the drain tray bottom 37 is preferably a molded plastic, the wheels are preferably made from a suitable synthetic material such as Nylotron ®, and the rotational friction between the rods and the panels can be minimized by making the rods from stainless steel. For high strength and durability, the coil spring 67 is preferably made from steel. For additional strength, a steel shank of length substantially equal to the length of a panel can be included within each panel.

The foregoing is considered as illustrative only of the principles of my invention. Further, since numerous modifications and changes will readily occur to those skilled in the art, it is not desired to limit the invention to the exact construction and operation shown and described, and accordingly all suitable equivalents may be resorted to, falling within the scope of my invention. Nor is it desired that the application of my invention be limited specifically for use in a pickup truck. Other possible applications include: covering the trailer portion of a tractor-trailer combination; covering open railroad cars or coal cars; awnings, both for stationary applications as well as for recreational vehicles and mobile homes; covering swimming pools; security door for commercial or residential use; garage door; covering for commercial airport baggage trailers; and covering for a tool box to be mounted on the forwardmost portion of the open body of a truck.

I claim:

1. For use in a pickup truck having an open body consisting of a flat bottom, two side walls, a front wall and a tail gage hingedly mounted to the rear end of the bottom, an improved sliding cover assembly having a pair of guide means mounted on the upper portion of the side walls of said open body, the said guide means comprising a left and a right extruded aluminum track of C-shaped cross-section having lengthwise coextensive channels communicating with the interior space of the open body, water seal means for preventing water leakage between the tracks and the side walls, cover means including a plurality of essentially planar, transversely elongated rectangular panels successively disposed adjacent to one another and extending across said open body, the said panels having end portions slidably mounted in said guide means, each panel having a first semi-cylindrical edge portion and a second semi-cylindrical edge portion having a radius larger than the radius of the first edge portion, said first edge portion being concentric with, and rotatably received by, said second edge portion of the adjacent panel, a plurality of rods, one each of said rods being inserted through each cylindrical space defined by concentric edge portions of two adjacent panels, the length of each of the rods being greater than the length of the panels thereby leaving an exposed end portion of a rod at each end of each panel, wheels rotatably mounted on the said exposed portions of each of the rods, said wheels having a diameter slightly less than the height of the channels of the tracks for rolling therewithin, whereby the panels are maintained in substantially parallel relation and the cover means is made strong and water-tight, spring activated return means mounted at the forward end of said open body and connected to the forward edge portion of said cover means, and latch means mounted at the rearward edge portion of said cover means for securing said cover means in an extended position for converting said open body to a closed body, wherein the improvement comprises arranging the panels such that adjacent panels are alternately wide and narrow, thereby facilitating the winding of the cover means into a space-saving, rolled configuration.

2. For use in a pickup truck having an open body consisting of a flat bottom, two side walls, a front wall and a tail gate hingedly mounted to the rear end of the bottom, an improved sliding cover assembly having a pair of guide means mounted on the upper portion of the side walls of said open body, the said guide means comprising a left and a right extruded aluminum track of C-shaped cross-section having lengthwise coextensive channels communicating with the interior space of the open body, water seal means for preventing water leakage between the tracks and the side walls, cover means including a plurality of essentially planar, transversely elongated rectangular panels successively disposed adjacent to one another and extending across said open body, the said panels having end portions slidably mounted in said guide means, each panel having a first semi-cylindrical edge portion and a second semi-cylindrical edge portion having a radius larger than the radius of the first edge portion, said first edge portion being concentric with, and rotatably received by, said second edge portion of the adjacent panel, a plurality of rods, one each of said rods being inserted through each cylindrical space defined by concentric edge portions of two adjacent panels, the length of each of the rods being greater than the length of the panels thereby leaving an exposed end portion of a rod at each end of each panel, wheels rotatably mounted on the said exposed portions of each of the rods, said wheels having a diameter slightly less than the height of the channels of the tracks for rolling therewithin, whereby the panels are maintained in substantially parallel relation and the cover means is made strong and water-tight, spring activated return means mounted at the forward end of said open body and connected to the forward edge portion of said cover means, and latch means mounted at the rearward edge portion of said cover means for securing said cover means in an extended position for converting said open body to a closed body, wherein the improvement comprises using aluminum for the panels and stainless steel for the rods thereby reducing the friction of rotation of the panels on the rods.

3. For use in a pickup truck having an open body consisting of a flat bottom, two side walls, a front wall and a tail gate hingedly mounted to the rear end of the bottom, an improved sliding cover assembly having a pair of guide means mounted on the upper portion of the side walls of said open body, the said guide means comprising a left and a right extruded aluminum track of C-shaped cross-section having lengthwise coextensive channels communicating with the interior space of the open body, water seal means for preventing water leakage between the tracks and the side walls, cover means including a plurality of essentially planar, transversely elongated rectangular panels successively disposed adjacent to one another and extending across said open body, the said panels having end portions slidably mounted in said guide means, each panel having a first semi-cylindrical edge portion and a second semi-cylindrical edge portion having a radius larger than the radius of the first edge portion, said first edge portion being concentric with, and rotatably received by, said second edge portion of the adjacent panel, a plurality of rods, one each of said rods being inserted through each cylindrical space defined by concentric edge portions of two adjacent panels, the length of each of the rods being greater than the length of the panels thereby leaving an exposed end portion of a rod at each end of each panel, wheels rotatably mounted on the said exposed portions of each of the rods, said wheels having a diameter slightly less than the height of the channels of the tracks for rolling therewithin, whereby the panels are maintained in substantially parallel relation and the cover means is made strong and water-tight, spring activated return means mounted at the forward end of said open body and connected to the forward edge portion of said cover means, and latch means mounted at the rearward edge portion of said cover means for securing said cover means in an extended position for converting said open body to a closed body, wherein the improvement comprises a spring activated return means that includes a housing mounted on the front wall of the open body and extending across said open body, said housing having front and rear panels, drain tray bottom with a weep hole therein, two side panels, and a cover, thereby defining a closed, substantially water-tight space, said cover having a transverse slot for receiving the cover means, a left and a right pinch block mounted in the interior space of the housing on the left and right sides of the open body, respectively, as by trapezoidal braces formed from one inch angle bar, a hollow rewind tube of length slightly less than the interior width of the housing, said rewind tube having its ends inserted into the pinch blocks such that the tube is disposed perpendicularly to the side walls, a left and a right guide wheel rotatably mounted on the rewind tube near its left and right ends, respectively, each guide wheel having a curved bracket attached at its peripheral curved surface and covering about one fourth of the area thereof, each of the said brackets having a semi-cylindrical edge portion of size and shape corresponding to the first semi-cylindrical edge portion of each of the panels of the cover means, the said semi-cylindrical edge portion of the curved brackets being concentric with, and rotatably received by, the second semi-circular edge portion of the forwardmost panel of the cover means, whereby rotational movement of the guide wheels causes translational movement of the cover means and vice-versa, a coil spring circumposed about the rewind tube and having one end attached to the rewind tube near one of the guide wheels and having its other end attached to the opposite guide wheel, said rewind tube and circumposed spring being inserted through a spring cover tube of length equal to the distance between the guide wheels, the said spring cover tube having flanges at its ends for attachment of the spring cover tube to the guide wheels, and wherein at least one of the pinch blocks includes lever means for manually and reversibly securing and releasing the rewind tube thereby facilitating adjustment of the tension in the spring for sliding movement of the cover means.

4. The improved sliding cover assembly of claim 3, wherein the improvement further comprises goose-necked-shaped rearward extensions from the left and right upper portions of the side panels of the housing, the rear edges of which extensions are connected to and continuous with the left and right tracks, respectively, whereby in closing movement the cover means is guided from the guide wheels into the tracks.

5. The improved sliding cover assembly of claim 4, wherein the extensions are adjustably mounted so that the distance between the extensions can be varied to accomodate truck bodies of various widths.

* * * * *